C. E. MITCHELL.
SIGNAL APPARATUS.
APPLICATION FILED FEB. 13, 1915.

1,205,244.

Patented Nov. 21, 1916.

3 SHEETS—SHEET 1.

Witnesses
C. F. Rudolph
John J. McCarthy

Inventor
C. E. Mitchell,
By Victor J. Evans
Attorney

C. E. MITCHELL.
SIGNAL APPARATUS.
APPLICATION FILED FEB. 13, 1915.
1,205,244.
Patented Nov. 21, 1916.
3 SHEETS—SHEET 2.
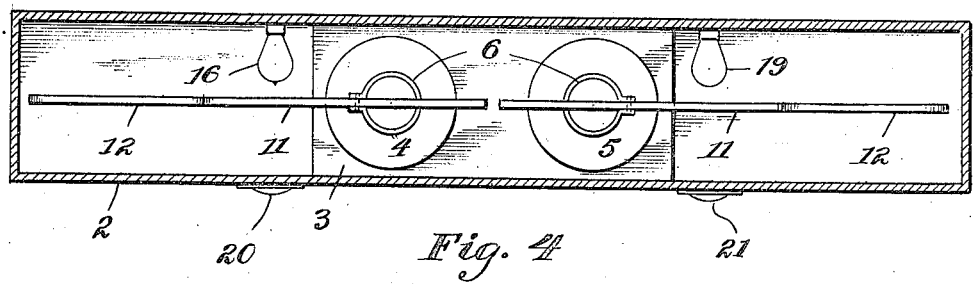
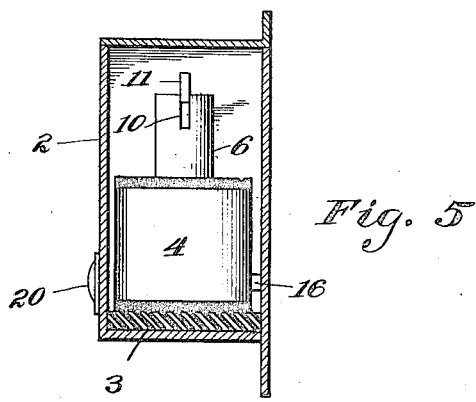
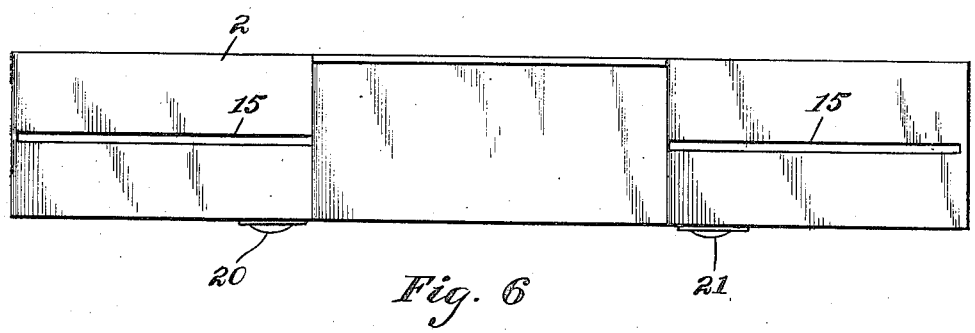
Witnesses
C. F. Rudolph
John J. McCarthy
Inventor
C. E. Mitchell,
By Victor J. Evans
Attorney

C. E. MITCHELL.
SIGNAL APPARATUS.
APPLICATION FILED FEB. 13, 1915.

1,205,244.

Patented Nov. 21, 1916.
3 SHEETS—SHEET 3.

Witnesses
C. F. Rudolph
John J. McCarty

Inventor
C. E. Mitchell,
By Victor J. Evans
Attorney

UNITED STATES PATENT OFFICE.

CHARLES E. MITCHELL, OF STOCKTON, CALIFORNIA.

SIGNAL APPARATUS.

1,205,244.  Specification of Letters Patent.  Patented Nov. 21, 1916.

Application filed February 13, 1915. Serial No. 8,030.

*To all whom it may concern:*

Be it known that I, CHARLES E. MITCHELL, a citizen of the United States of America, residing at Stockton, in the county of San Joaquin and State of California, have invented new and useful Improvements in Signal Apparatus, of which the following is a specification.

This invention relates to improvements in signal apparatus and has particular application to a direction indicating signal for motor vehicles.

In carrying out the present invention, it is my purpose to provide a direction indicating signal for motor vehicles whereby the driver of the vehicle may notify pedestrians and the drivers of following vehicles when he is about to take a turn and whereby pedestrians and the drivers of following vehicles will be notified automatically when the vehicle is about to turn, in the event of the driver of such vehicle neglecting to operate the signal manually.

It is also my purpose to provide apparatus of the class described which will operate efficiently and effectively day and night, which will embrace the desired features of simplicity, efficiency and durability, and which may be manufactured, marketed and maintained at a minimum expense.

With the above and other objects in view, the invention consists in the construction, combination and arrangement of parts hereinafter set forth in and falling within the scope of the claims.

Figure 1:
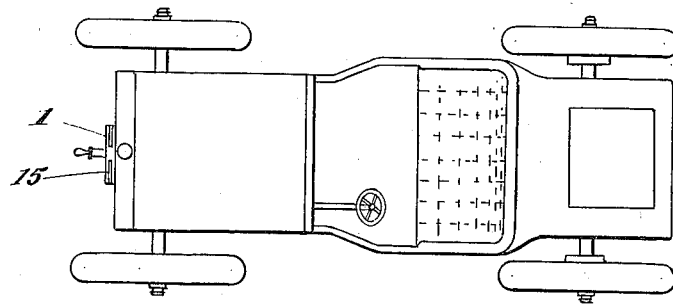
Figure 2:
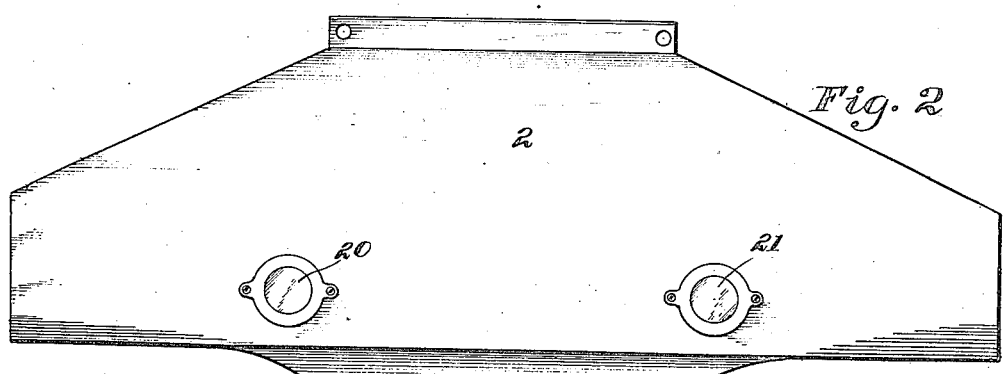
Figure 3:
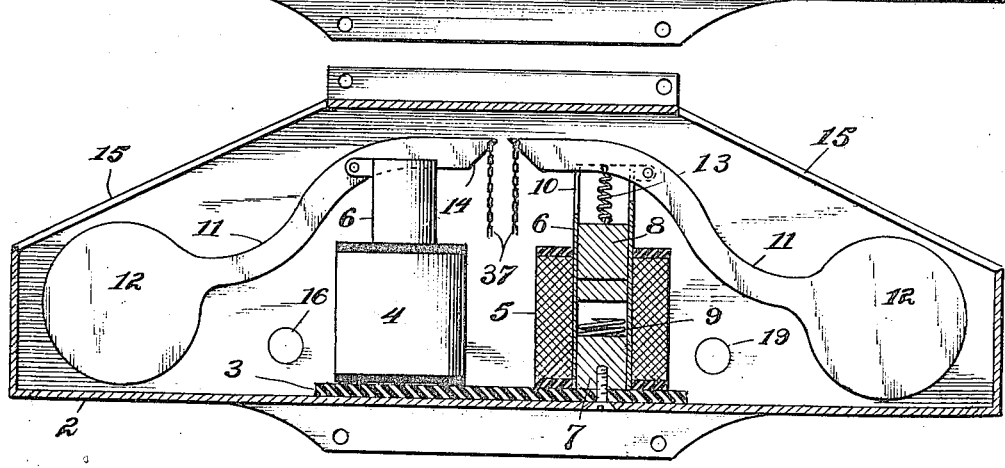
Figure 7:
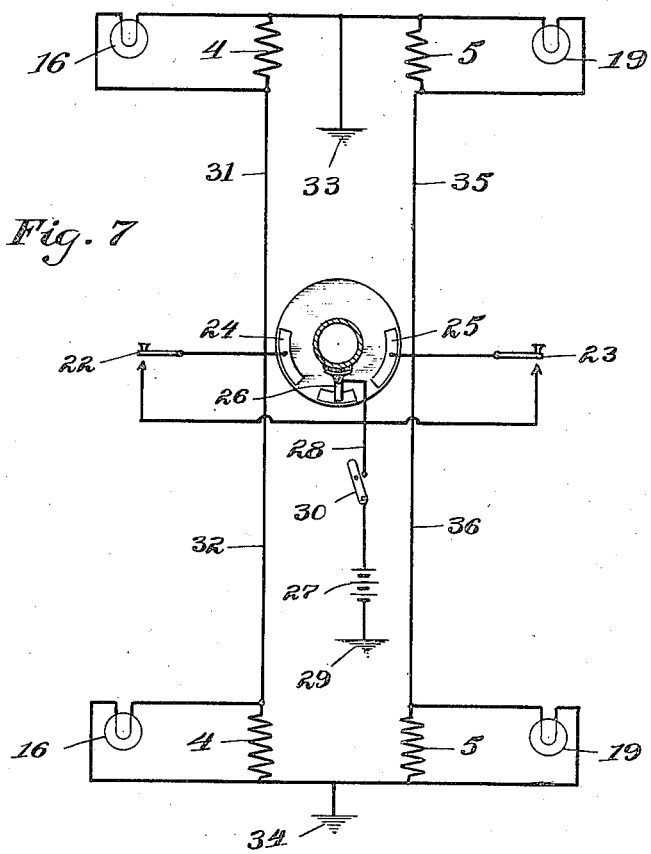
Figure 8:
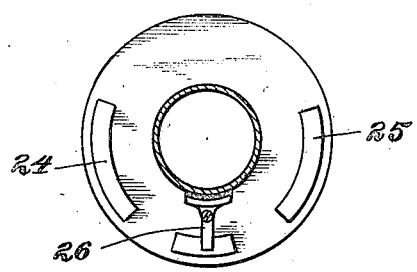

In the accompanying drawings: Figure 1 is a diagrammatic top plan view of a motor vehicle equipped with signal apparatus constructed in accordance with my present invention, the signals being located at the forward and rear ends of the vehicle. Fig. 2 is a view in front elevation of one of the signaling devices removed from the vehicle. Fig. 3 is a longitudinal sectional view through the device. Fig. 4 is a horizontal sectional view therethrough. Fig. 5 is a cross sectional view through the same. Fig. 6 is a top plan view of the device. Fig. 7 is a diagrammatic view showing the circuit connections. Fig. 8 is a cross sectional view through the steering column of the motor vehicle showing the circuit closing means connected therewith.

Referring now to the drawings in detail, 1, 1 designate signaling devices located at the front and rear ends of the motor vehicle respectively so that the signals will be visible from the front and rear of the vehicle. In the present instance, each device 1 comprises a casing 2 constructed of metal or other appropriate material and comprising a bottom wall, front and back walls, end walls and a top wall, the side portions of the latter tapering downwardly from the center portion toward the extremities of the wall and the top edges of the front and back walls being correspondingly formed to accommodate the top wall. It is conceivable, however, that the construction of the casings 2 may be varied. These various walls are appropriately connected to one another and the casing is suitably fastened to a support at the particular end of the vehicle where the casing is located so that the casing will be effectively supported upon the vehicle and held in proper position.

Disposed upon the bottom wall of each casing 1 and suitably secured thereto is a base plate 3 preferably constructed of insulating material and mounted upon the base plate 3 and fastened thereto are vertically disposed solenoids 4, 5 spaced apart longitudinally of the casing. Mounted within each solenoid and projecting upwardly therefrom is a tube 6 disposed concentrically of the solenoid and preferably formed of non-magnetic material, such, for instance, as brass and secured to the base 3 and projecting upwardly within the tubes 6 are stationary cores 7 respectively each of a length less than one-half the length of the core of the solenoid. Slidably mounted within the upper ends of the tubes 6 respectively are movable cores 8 adapted to be drawn into the solenoids when the latter are energized and interposed between the confronting ends of the cores 7 and 8 are expansion springs 9 resting upon the respective cores 7 and acting to prevent sticking of the stationary and movable cores, due to residual magnetism, succeeding the deënergization of the solenoid. The upper end of each tube 6, at diametrically opposite points, is formed with vertical slots 10, 10 and the slots in one tube aline with those in the other tube in a plane extending longitudinally of the casing.

Mounted between the walls of the slots 10, 10 in the respective tubes and pivoted to the walls of the outer slots are signal arms 11, 11. In the present instance, the arms 11 are sinuous and the outer ends thereof are equipped with signal blades 12 normally disposed in proximity to the bottom wall of the casing, while the inner ends of the arms are offset upwardly from the outer ends thereof and connected with the upper ends of the respective cores 8 through the medium of springs 13 or other resilient connections. The inner extremities of the arms 11 are cut on a bias as at 14 so that when the arms are swung under the action of the solenoids the inner edges thereof may squarely abut the upper end portions of the solenoids. The downwardly inclined portions of the top wall of the casing are formed with longitudinally extending slots 15 respectively and through these slots the outer ends of the arms 11 and the blades 12 work so that when the arms 11 are swung about their pivotal connections with the respective tubes under the action of the cores 8 and solenoids 4, 5, the outer ends of the arms will be projected through the slots 15 above the top wall of the casing, thereby rendering the signal blades visible.

Secured to the rear wall of the casing 1 adjacent to the magnet 4 is a signal lamp 16, while secured to the said wall of the casing adjacent to the solenoid 5 is a signal lamp 19 and the front wall of the casing in alinement with the signal lamps 16 and 19 is provided with bull's eyes 20, 21 of different colors, the bull's eye 20 corresponding to the lamp 16 being colored green and the bull's eye 21 corresponding with the lamp 19 red, for instance.

Located upon the steering wheel of the motor vehicle or some other appropriate support are push buttons 22, 23 designed to be manually operated. In the present instance, contact segments 24, 25 are disposed adjacent to the steering column concentrically thereof and suitably supported while fixed to the steering column and insulated therefrom is a contact brush 26 adapted to ride over the contact segment 24 when the steering column is turned in one direction and engage the segment 25 when the direction of movement of the steering column is reversed, the brush 26 lying, normally, at a point between the adjacent ends of the segments 24 and 25.

27 designates a battery suitably located upon the vehicle and having one side connected to the brush 26 by way of a wire 28 and the other side grounded as at 29. In the present instance, a controlling switch 30 is located in the conductor 28 so that the battery may be cut in and out of service. Connected with the contact segment 24 and extending toward the front and rear of the vehicle respectively are conductors 31, 32. The forward end of the conductor 31 is connected by means of branch conductors with one side of the solenoid 4 and one terminal of the signal lamp 16, while the rear end of the conductor 32 is connected with one side of the solenoid 4 and one side of the lamp 16 in the casing at the rear of the vehicle. The remaining terminals of the solenoid 4 and lamp 16 in the casing at the forward end of the vehicle are grounded as at 33, while the remaining terminals of the solenoid 4 and lamp 16 in the casing at the rear of the vehicle are grounded as at 34. From the segment 25 lead conductors 35, 36 extending toward the front and rear of the vehicle respectively and the forward end of the conductor 35 is connected to one side of the solenoid 5 and one terminal of the lamp 19 at the forward end of the vehicle, while the remaining terminals of such solenoid and lamp are connected to the ground 33. The rear end of the conductor 36 is connected by suitable branch conductors with one side of the solenoid 5 and one side of the lamp 19, while the remaining terminals of such solenoid and lamp are connected to the ground at 34. In the present instance, the push button 22 is connected across the conductors 32 and 28, while the push button 23 is connected across the conductors 36 and 28. Thus, the push buttons are connected in parallel with the contacts 24 and 25 and the brush 26.

In practice, when the driver of a vehicle is about to steer the vehicle in one direction, he presses the button 22, thereby closing the circuit of the solenoids 4 and lamps 16 in the casings at the forward and rear ends of the vehicle. When each solenoid 4 is energized, such solenoid draws its armature 8 downwardly and through the spring connection 13 swings the arm 11 about its pivotal connection with the upper end of the tube 6, thereby swinging the blade 12 and outer end of the arm 11 through the slot 15 in the top wall of the casing to exposed position so that pedestrians and vehicle drivers in front and at the rear of the vehicle will be notified of the driver's intentions. On the other hand, when the driver is about to turn the vehicle in the opposite direction, the push button 23 is depressed, thereby closing the circuits of the solenoids 5 and signal lamps 19 in the forward and rear casings whereby the other signal arms and blades are actuated to exposed position. When the signal lamps 16 are energized, the bull's eyes 20 are illuminated, while when the signal lamps 19 are energized the bull's eyes 21 are illuminated.

Should the driver of the vehicle neglect to depress one or the other of the push buttons when about to make a turn, the brush 26 will engage one or the other of the segments 24, 25 according to the direction of rotation of the steering post to steer the vehicle, thereby closing the particular solenoid and lamp circuits automatically so that the signal blades will be actuated to exposed position and the signal lamps associated with such blades energized to notify persons, in the vicinity of the vehicle, of the intentions of the driver.

In this embodiment of my invention, the inner ends of the levers 11, 11 in each casing are connected with the extremities of chains 37 respectively or other flexible elements leading to the driver's seat and within convenient reach of the driver of the vehicle. By means of these chains the signal arms and blades may be actuated initially by the operator in the event of failure of the electro responsive devices.

While I have herein shown and described the preferred form of my invention by way of illustration, I wish it to be understood that I do not limit or confine myself to the precise details of construction herein described and delineated, as modification and variation may be made within the scope of the claims without departing from the spirit of the invention.

I claim:

1. A signal device comprising a casing having the top wall thereof formed with a slot, a base plate mounted upon the bottom wall of said casing, a solenoid secured to said base plate, a tube within said solenoid and projecting above the latter and having the upper end formed with a slot, a signal arm pivoted in the slotted portion of said tube, a signal blade on one end of said arm adapted to be projected through the slot in the top wall of said casing, a stationary core in the bottom of said solenoid, a movable core mounted in said tube and adapted to be drawn into the latter upon the energization of said solenoid, and a connection between the upper end of said last-named core and said signal arm whereby the latter will be swung to signaling position upon the energization of the solenoid.

2. A signal device comprising a casing having the top wall thereof formed with a slot, a base plate mounted upon the bottom wall of said casing, a solenoid secured to said base plate, a tube within said solenoid and projecting above the latter and having the upper end formed with a slot, a signal arm pivoted in the slotted portion of said tube, a signal blade on one end of said arm adapted to be projected through the slot in the top wall of said casing, a stationary core in the bottom of said solenoid, a movable core mounted in said tube and adapted to be drawn into the latter upon the energization of said solenoid, a connection between the upper end of said last-named core and said signal arm whereby the latter will be swung to signaling position upon the energization of the solenoid, and means interposed between the said movable and stationary cores to prevent sticking thereof and to assist the movable core to return to normal position upon the deënergization of the solenoid.

In testimony whereof I affix my signature in presence of two witnesses.

CHARLES E. MITCHELL.

Witnesses:
   Chas. E. Littlehale,
   Chas. E. Stanley.